(No Model.)
S. BAXTER.
ANCHOR.
No. 318,229. Patented May 19, 1885.
FIG:1.
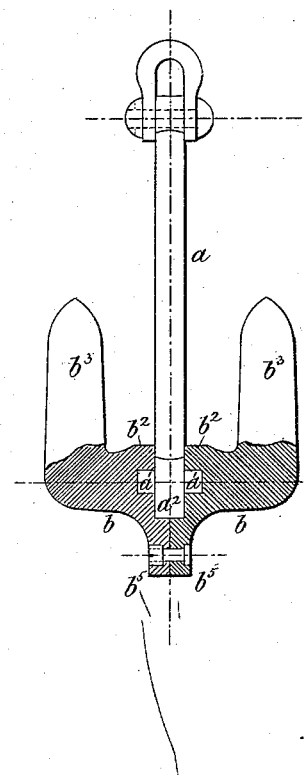
FIG:2.
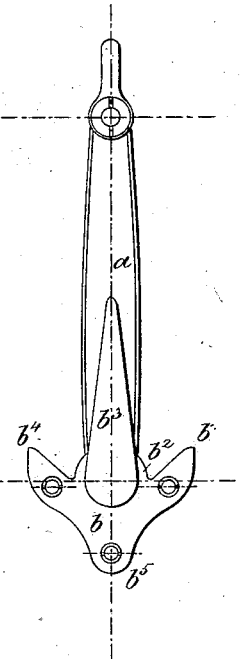
FIG:7.
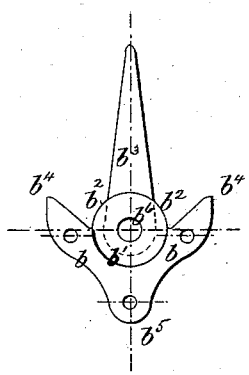
FIG:3. FIG:4.
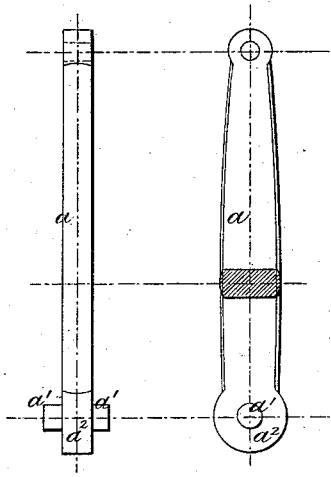
FIG:5. FIG:6.
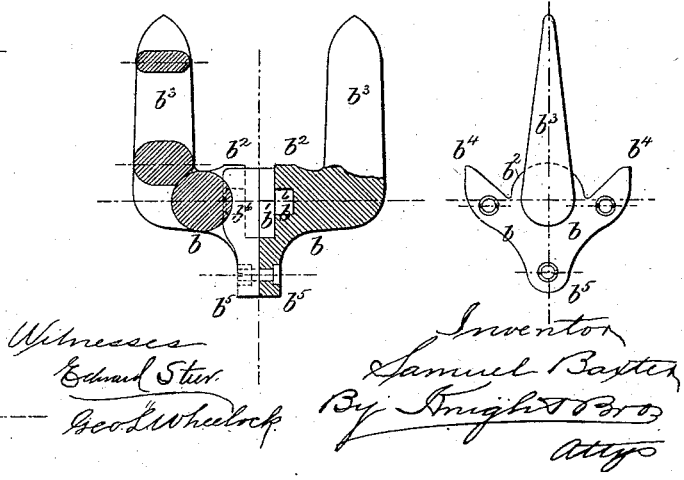
Witnesses
Edward Stew.
Geo L Wheelock
Inventor
Samuel Baxter
By Knight Bro
Attys
N. PETERS, Photo-Lithographer, Washington, D. C.

UNITED STATES PATENT OFFICE.

SAMUEL BAXTER, OF LONDON, ENGLAND.

ANCHOR.

SPECIFICATION forming part of Letters Patent No. 318,229, dated May 19, 1885.

Application filed November 6, 1884. (No model.) Patented in England November 11, 1880, No. 4,650.

*To all whom it may concern:*

Be it known that I, SAMUEL BAXTER, a subject of the Queen of Great Britain, residing at 18 and 19 Great St. Helen's, in the city of London, England, have invented certain new and useful Improvements in Anchors, (for which I have received Letters Patent in Great Britain, No. 4,650, dated 11th November, 1880,) of which the following is a specification.

The invention relates to that class of anchors known as "trunnion-anchors;" and it consists of certain improvements which will render the said anchors more certain in action and less liable to wear and to become clogged or choked, and thereby rendered inoperative, while they are also so formed as to offer no impediment to the stowing or seating thereof on shipboard. In said trunnion-anchors as formerly constructed, the lower end of the shank was tapered down to the diameter of the trunnions, and was flush therewith. This rendered it necessary to form that part of the socket in the crown of the anchor fitting the end of the shank with splayed sides to permit of the required motion of the shank and arms upon each other, and to provide stops to limit the motion of such parts. This construction left openings on each side of the lower end of the shank into which sand, dirt, or other foreign matter might enter to the injury of the anchor's action. According to my invention I obviate this difficulty by forming the lower end of the shank with a cylindrical enlargement or head of larger diameter than and concentric with the trunnions, and fitting closely the socket formed for it in the crown of the anchor, which socket is of semi-cylindrical form or thereabout. The enlargement or head of the shank is also preferably flush with the shoulders of the arms. I also prolong the catching-points and bevel their inner faces, so as to enable them to act both as catching-points to insure the arms properly taking the ground and as stops to limit the motion of the arms and shanks upon each other, while by such construction the parts are subjected to less strain than heretofore. I also, in order to enable the arms to be more readily lifted clear of the ground, prolong the head of the crown, so as to obtain a leverage thereon against which the shank, on being raised, can act to lift the arms or flukes of the anchor out of the ground. I also, in order to avoid as far as possible any impediment to the sealing of the anchor, countersink the bolt heads and nuts connecting together the crown, the two arms or flukes, and the catching-points, and I form the arms or flukes of a gradually-decreasing section from the crown to the points, and without any angles or projections thereon which would interfere with its ready seating or injure the parts of the vessel with which it may come into contact.

My invention is represented in the accompanying drawings, in which Figure 1 represents a front elevation, partly in section, of my improved anchor; and Fig. 2 is a side elevation. Figs. 3 and 4 are respectively a front and a side elevation of the shank and trunnions apart from the crown and arms or flukes. Fig. 5 is a front elevation partly in section, and Fig. 6 is a side elevation of the crown, arms or flukes, and catching-points, showing the two parts of the same bolted together but separate from the shank; and Fig. 7 is an inner face view of one of the arms or flukes and its half of the crown and catching-points, and showing the socket or recess to receive one of the trunnions of the shank.

$a$ represents the shank, and $a'$ the trunnions. Instead, however, of tapering down the lower end of the shank to the diameter of the trunnions, as formerly, I form a cylindrical enlargement or head, $a^2$, at the lower end of the shank $a$, of larger diameter than and concentric with the trunnions, and I form a socket, $b'$, in the crown $b$ of the anchor to fit closely such enlargement or head $a^2$, such socket being of semi-cylindrical form, or thereabout. The enlargement or head $a^2$ of the shank is also preferably flush with the shoulders $b^2$ of the arms $b^3$, as shown. I also prolong the catching-points $b^4$ and bevel their inner faces, so as to enable them to act both as catching-points to insure the arms $b^3$ properly taking the ground and as stops to limit the motion of the arms $b^3$ and shank $a$ upon each other, while by such construction the parts are subjected to less strain than when constructed as heretofore. I also, in order to enable the arms $b^3$ to be more readily lifted clear of the ground, prolong the head $b^5$ of the crown $b$, so as to obtain a leverage thereon against which the shank $a$ on being raised can act to lift the arms or flukes $b^3$ out of the ground. The trunnions $a'$ fit into sockets $b^6$, formed to receive them in the head $b$, as heretofore. I also countersink the bolt heads and nuts $c$ in the head $b^5$ and catching-points $b^4$, and I form the arms or flukes $b^3$ of a gradually-decreasing section from the crown to the points, and as straight and smooth as possible, so as to prevent as far as possible any interference with its ready seating, and also to prevent injury to any parts of the vessel with which it may come into contact.

Having thus described the nature of my said invention and the mode in which I carry the same into effect, I would have it understood that what I claim is—

1. The combination, with the shank $a$, having the trunnions $a'$, of the two-part crown $b$, provided with cavities $b^2$ for the reception of said trunnions, secured together, substantially as set forth.

2. The combination, with the shank $a$, having the circular enlargement $a^2$, and the trunnions $a'$, of the two-part crown provided with the cavities $b'$ and $b^6$ for the reception of said enlargement $a^2$ and trunnions $a'$, respectively, substantially as set forth.

3. The combination, with the shank $a$, having the trunnions $a'$, of the two-part crown $b$, having the cavities $b^6$, the projections $b^4$ and $b^5$, and the bolts $c$, all arranged substantially as set forth.

4. The combination, with the shank $a$, of the oscillating crown $b$, having the flukes $b^3$ on the respective sides of said shank, and the projections $b^4$, located in the same plane as said shank, substantially in the manner and for the purposes set forth.

SAML. BAXTER.

Witnesses:
S. P. TYRRELL,
JOHN D. VENN.